United States Patent
Chow et al.

(10) Patent No.: US 8,293,004 B2
(45) Date of Patent: Oct. 23, 2012

(54) FLUORAPATITE-FORMING CALCIUM PHOSPHATE CEMENTS

(75) Inventors: Laurence C. Chow, Germantown, MD (US); Shozo Takagi, Gaithersburg, MD (US)

(73) Assignee: ADA Foundation, Chicago, IL (US)

( * ) Notice: Subject to any disclaimer, the term of this patent is extended or adjusted under 35 U.S.C. 154(b) by 0 days.

(21) Appl. No.: 13/175,368

(22) Filed: Jul. 1, 2011

(65) Prior Publication Data

US 2012/0000393 A1   Jan. 5, 2012

Related U.S. Application Data

(60) Provisional application No. 61/361,113, filed on Jul. 2, 2010, provisional application No. 61/448,485, filed on Mar. 2, 2011.

(51) Int. Cl.
   *C04B 12/02*   (2006.01)

(52) U.S. Cl. .......... 106/690; 106/691; 106/35; 423/309; 423/311

(58) Field of Classification Search .................. 106/690, 106/691, 35; 423/309, 311
See application file for complete search history.

(56) References Cited

U.S. PATENT DOCUMENTS

| | | |
|---|---|---|
| 5,525,148 A | 6/1996 | Chow et al. |
| 5,954,867 A | 9/1999 | Chow et al. |
| 5,997,624 A | 12/1999 | Chow et al. |
| 6,379,453 B1 | 4/2002 | Lin et al. |
| 6,649,669 B2 | 11/2003 | Dickens |
| 7,351,280 B2 | 4/2008 | Khairoun et al. |
| 2007/0178220 A1 | 8/2007 | Karlinsey |
| 2010/0003304 A1 | 1/2010 | Yuan et al. |

OTHER PUBLICATIONS

International Search Report and the Written Opinion of PCT/US11/42788 mailed Oct. 28, 2011, 10 pgs.
ADA specification No. 9 for dental silicate cement. In: Guide to dental materials and devices. 7th ed. Chicago, IL: American Dental Association; 1974/1975. p. 194-202.
Caslavska V., Moreno E., Brudevold F. (1975). Apatitic fluoride produced by various topical fluoride treatments (abstract 541). J Dent. Res (special issue A):54, 180.
Chow L., Hirayama S., Takagi S., Parry E. (2000). Diametral tensile strength and compressive strength of a calcium phosphate cement: effect of applied pressure. J Biomed Mater Res (Appl Biomater) 53B:511-517.
Chow L., Markovic M., Frukhtbeyn S., Takagi S. (2005). Hydrolysis of tetracalcium phosphate under a near-constant-composition condition—effects of pH and particle size. Biomaterials. Feb;26(4):393-401.
Christoffersen J., Christoffersen M., Kibalczyc W. et al (1988). Kinetics of dissolution and growth of calcium fluoride and effects of phosphate. Acta Odontol Scand 46:325-326.
Elliott J. (1994). Structure and chemistry of the apatites and other calcium orthophosphates.

(Continued)

*Primary Examiner* — Paul Marcantoni
(74) *Attorney, Agent, or Firm* — Banner & Witcoff, Ltd.

(57) ABSTRACT

This study reports in vitro and in vivo properties of fluorapatite (FA)-forming calcium phosphate cements (CPCs). Experimental cements contained from (0 to 3.1) mass % of F, corresponding to presence of FA at levels of approximately (0 to 87) mass %. The crystallinity of the apatitic cement product increased greatly with the FA content. When implanted subcutaneously in rats, the in vivo resorption rate decreased significantly with increasing FA content. The cement with the highest FA content was not resorbed in soft tissue, making it biocompatible and bioinert CPC. These bioinert CPCs are candidates for use in useful applications where slow or no resorption of the implant is required to achieve the desired clinical outcome.

19 Claims, 11 Drawing Sheets

OTHER PUBLICATIONS

Grzanna M., LeGeros R., Polotsky A., Lin S., Hungerford O., Frondoza C. (2003). Fluoridesubstituted apatite support proliferation and expression of human osteoblast phenotype in vitro. Key Engineering Materials vols. 240-242:695-698.

Inoue M., Nagatsuka H., Tsujigiwa H., Inoue M., LeGeros R., Yamamoto T., Nagai N. (2005). In vivo effect of fluoride-substituted apatite on rat bone. Dent Mater J 24:398-402.

Inoue M., Rodriguez A., Nagai N., Nagatsuka H., LeGeros R., Tsujigiwa H., Inoue M., Kishimoto E., Takagi S. (2010). Effect of fluoride-substituted apatite on in vivo bone formation. J Biomater Appl Mar 10.

LeGeros R. (1991). Calcium phosphates in oral biology and medicine.

Lehr J., Brown B., Frazier A., Smith J., Thrasher R. (1967). Chemical Engineering Bulletin 6;95.

Sakae T., Ookubo A., LeGeros R., Shimogoryo R., Sato Y., Lin S., Yamamoto H., Kozawa (2003). Bone formation induced by several carbonate- and fluoride containing apatite implanted in dog mandible. Key Engineering Materials vols. 240-242:395-398.

Takagi S., Chow L. (2001). Formation of macropores in calcium phosphate cement implants. J Mater Sci: Mater in Medicine 12:135-139.

Yoon B., Kim H., Lee S., Bae C., Koh Y., Kong Y., Kim H. (2005). Stability and cellular responses to fluorapatite-collagen composites. Biomaterials 26:2957-2963.

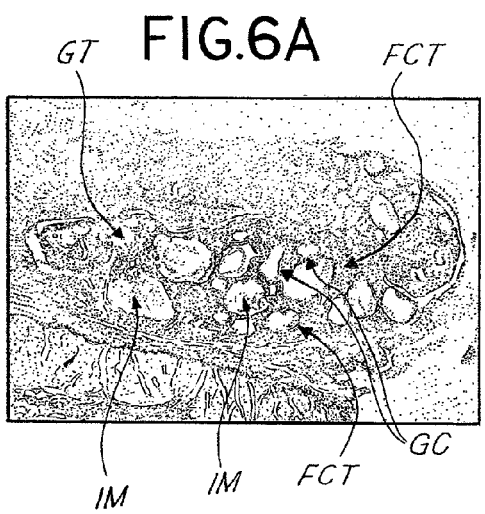
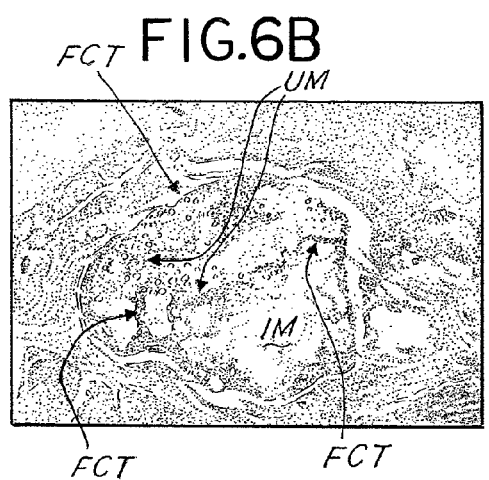
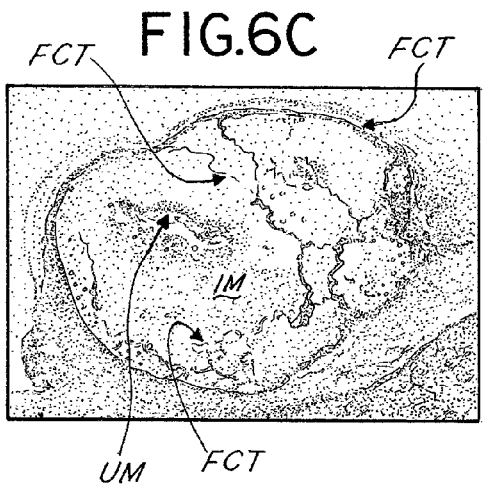
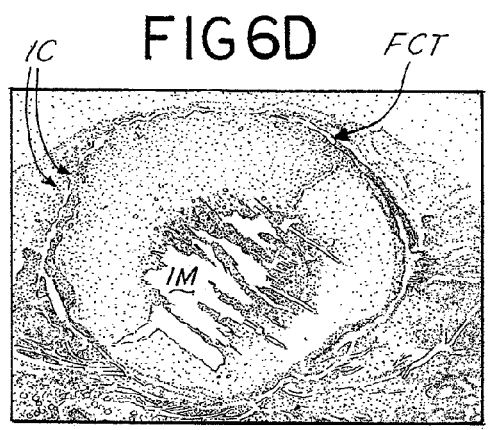

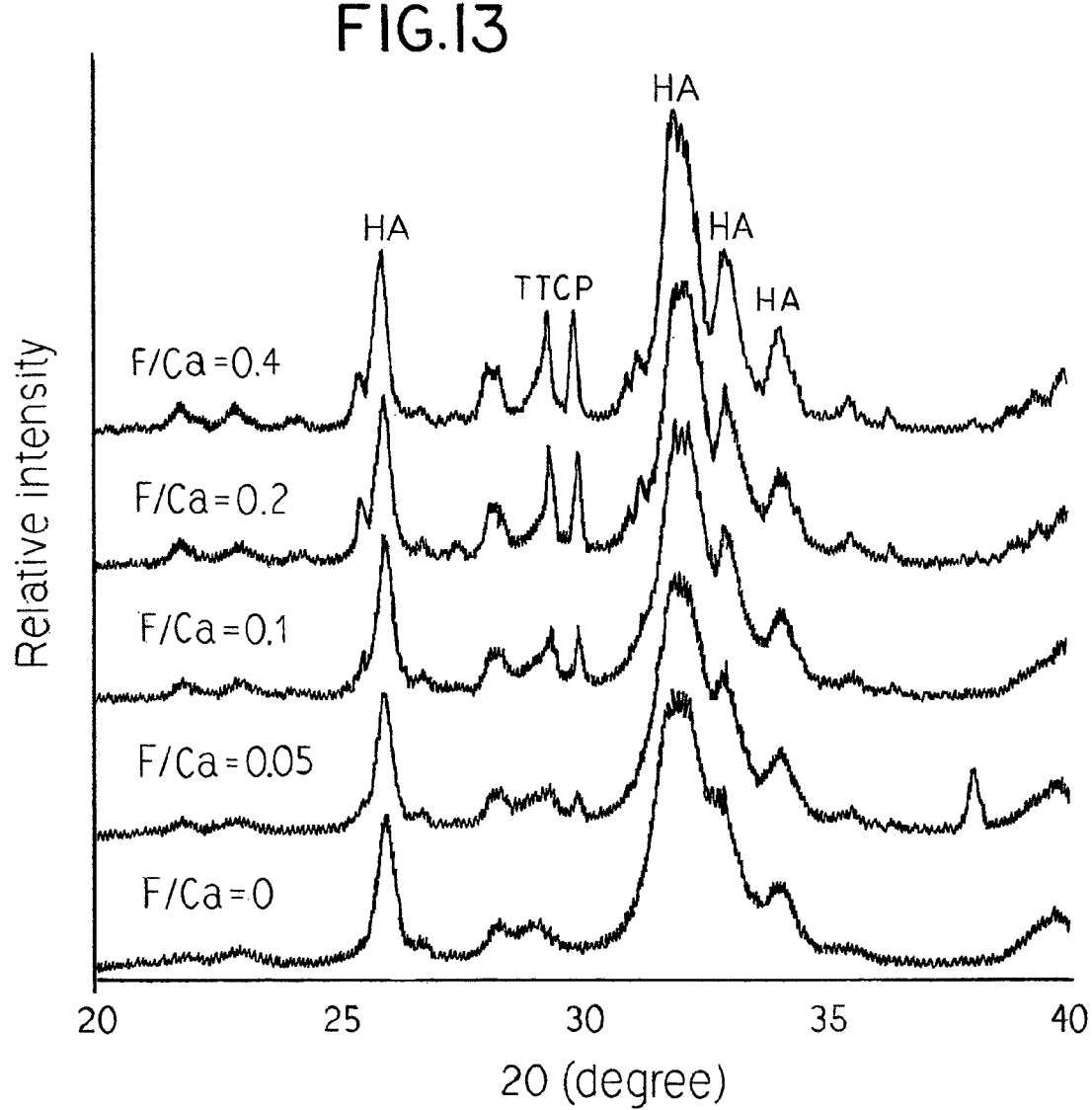

FLUORAPATITE-FORMING CALCIUM PHOSPHATE CEMENTS

CROSS REFERENCE TO RELATED APPLICATIONS

This is a utility application based upon and incorporating by reference provisional application Ser. Nos. 61/361,113 filed Jul. 2, 2010 entitled In Vitro and in Vivo Characteristics of Fluorapatite-Forming Calcium Phosphate Cements and 61/448,485 filed Mar. 2, 2011 entitled In Vitro and in Vivo Characteristics of Fluorapatite-Forming Calcium Phosphate Cements for which priority is claimed.

GOVERNMENT INTEREST

This investigation was supported, in part, by Grant DE 11789 to the American Dental Association Foundation from the National Institute of Dental and Craniofacial Research, and was conducted by Paffenbarger Research Center at the National Institute of Standards and Technology. The animal study was supported, in part, by Grant DE 11789 to the Nihon University School of Dentistry and was conducted at Nihon University School of Dentistry, Nihon, Japan.

BACKGROUND OF THE INVENTION

In a principal aspect, the present invention relates to calcium phosphate cements, their preparation, composition and physicochemical properties particularly as enhanced by fluoride materials.

Calcium phosphate cements (CPCs) have been the subject of considerable interest in the field of bone graft biomaterials. Such materials have been found to be biocompatible and osteoconductive. This leaves CPCs bio-resorption characteristics as one of the remaining important properties to be more fully understood and controlled in order to achieve optimum CPC-to-bone conversion.

CPCs of different compositions can form different end products such as hydroxyapatite (HA), octacalcium phosphate, and dicalcium phosphate dihydrate (DCPD), also known as brushite. An in vivo property of HA-forming CPCs is that the HA formed does not dissolve spontaneously in a normal physiological fluid environment, yet is resorbable under cell-mediated acidic conditions. Although DCPD is soluble in normal physiological fluids, studies have shown that resorption of DCPD-forming CPC is also essentially cell-mediated, mainly due to conversion of the DCPD to an apatitic phase in situ.

In this regard, studies on fluoride (F)-substituted hydroxyapatite (HA)-based biomaterials show that F can play useful roles in calcium phosphate-based bone grafts. F-substitute HA has been shown to promote bone formation in rat tibia [Inoue et al, 2005[1]; Inoue 2010[2]] and dog mandible [Sakae et al., 2003[3]]. Studies using human osteoblast-like cells show that a low level F-substitution HA enhanced osteocalcin expression [Grzanna et al., 2003[4]], and fluorapatite (FA)-collagen composites exhibited higher cell proliferation and differentiation [Yoon et al., 2005[5]] compared to the F-free counterpart. A study in the patent literature [Yuan et al., 2010[6]] claims that NaF-loaded tricalcium phosphate (TCP) ceramic exhibited osteoinductivity in a goat model. These findings suggest that fluoride may play a role in bone formation and therefore F-releasing bone graft materials may provide an added advantage. The noted references are incorporated herewith by reference.

[1] Inoue M, Nagatsuka H, Tsujigiwa H, Inoue M, LeGeros R Z, Yamamoto T, Nagai N (2005). In vivo effect of fluoride-substituted apatite on rat bone. Dent Mater J 24:398-402.
[2] Inoue M, Rodriguez A P, Nagai N, Nagatsuka H, LeGeros R Z, Tsujigiwa H, Inoue M, Kishimoto E, Takagi S (2010). Effect of fluoride-substituted apatite on in vivo bone formation. J Biomater Appl March 10.
[3] Sakae T, Ookubo A, LeGeros R Z, Shimogoryo R, Sato Y, Lin S, Yamamoto H, Kozawa H (2003). Bone formation induced by several carbonate- and fluoride containing apatite implanted in dog mandible. Key Engineering Materials vols 240-242:395-398.
[4] Grzanna M, LeGeros R Z, Polotsky A, Lin S, Hungerford D S, Frondoza C G (2003). Fluoride-substituted apatite support proliferation and expression of human osteoblast phenotype in vitro. Key Engineering Materials vols 240-242: 695-698.
[5] Yoon B H, Kim H W, Lee S H, Bae C J, Koh Y H, Kong Y M, Kim H E (2005). Stability and cellular responses to fluorapatite-collagen composites. Biomaterials 26:2957-2963.
[6] Yuan H, de Bruijn J D, de Groot K (2010). Method of improving the osteoinductivity of calcium phosphate. Patent Application Publication# US2010/0003304 A1, January 7.

A number of patents on calcium phosphate cements (CPC) [Chow and Takagi, 1996[7], Chow and Takagi, 1999[8]; Lin et al, 2002[9]; Dickens, 2003[10]; Khairoun et al, 2008[11]] have disclosed the inclusion of F, in either a highly soluble form, e.g., sodium fluoride (NaF), or sparingly soluble form, e.g., calcium fluoride ($CaF_2$), into the compositions. However, no attempts are understood to have been made to understand the amounts and forms of F that can be incorporated into the CPC product. Neither is there understood to be information on the properties of any F-containing CPCs.

[7] Chow L C, Takagi S (1996). Self-setting calcium phosphate cements and methods for preparing and using them. U.S. Pat. No. 5,525,148, June 11.
[8] Chow L C, Takagi S (1999). Self-setting calcium phosphate cements and methods for preparing and using them. U.S. Pat. No. 5,954,867, September 21.
[9] Lin Jiin-Huey C, Ju Chien-Ping, Chen Wen-Cheng (2002). Process for producing fast-setting, bioresorbable calcium phosphate cements. U.S. Pat. No. 6,379,453, April 30.
[10] Dickens S (2003). Single solution bonding formulation. U.S. Pat. No. 6,649,669, November 18.
[11] Khairoun I, LeGeros R Z. Daculsi G, Bouler Jean-Michael, Guicheux J, Gauthier O (2008). Macroporous, resorbable and injectible calcium phosphate-based cements (MCPC) for bone repair, augmentation, regeneration, and osteoporosis treatment. U.S. Pat. No. 7,351,280, April 1.

Nonetheless such information is believed to be relevant since CPCs with different resorption rates may be especially suitable for different clinical applications. That is, for some clinical applications, specifically endodontic applications, such as root end fill, perforation repair, etc., it is desirable to have CPCs that are biocompatible and osteoconductive, yet non-bioresorbable in soft and hard tissues. Since in vivo resorption is a result of dissolution in a cell-mediated acidic environment, CPCs that form products that have little or practically no solubility in such acidic conditions can be expected to be essentially non-resorbable.

For example, literature suggests that fully or partially fluoridated HA materials have significantly lower solubility in acids. Thus, fluorapatite (FA)-forming CPCs can be expected to have much lower resorbability than HA-forming CPCs. As a consequence, development of FA-forming CPCs and their physicochemical properties as well as in vivo resorption characteristics are reasonable objectives in order to facilitate their utility. As a consequence, methods for preparation of fluoride containing CPC's and their associated physicochemical properties will enable useful therapeutic options, for example, with respect to clinical endodontic applications.

SUMMARY OF THE INVENTION

Briefly the present invention comprises compositions of fluoride containing CPCs as well as the associated properties of the various compositions and techniques for making such compositions. More specifically, the invention comprises techniques to prepare F-containing CPC materials with controllable amounts of the following desirable minor components and structure:

(1) F incorporated in the forms of F-substituted HA (F-HA) and calcium fluoride;
(2) Carbonate incorporated into F-HA by replacing a phosphate ion in the structure (type-B carbonate incorporation); and
(3) F-containing CPC materials having controllable apatite crystallinity effected by carbonate compounds.

The techniques enable design and manufacture of F-CPC compositions having a prescribed range of in vivo resorption rates and osteoconductivity.

An aspect of the invention is discovery of F-containing CPC-materials with adequate setting time and physical and biological properties suitable for use in bone defect repair and endodontic applications that can be produced by mixing a powder mixture and a liquid. The powder mixture consists of DCPA and/or DCPD and at least one compound that has a Ca/P molar ratio of 1.5 or higher. Examples are α-TCP, β-TCP, ACP, TTCP, CaO, $CaCO_3$. The source of F can be present in either the powder mixture or cement liquid or both. A fluoride (F) compound with adequate solubility to dissolve readily and participate in the cement setting reactions can be used. Examples are NaF, KF, and HF. The cement liquid can be a phosphate-containing solution with phosphate concentration from 0.1 to 3 mol/L and pH from 0.1 to 12. Other solutions that have been previously used for calcium phosphate cements may also be used. A F source can be dissolved into the solution when desired or incorporated in the powder mixture.

As a further aspect of the invention, particle size of the DCPA (DCPD) and the other Ca-containing compounds are effective in controlling the properties (1) to (3) mentioned above. Specifically particle sizes of powder constituents typically are in the range of 1 to 20 microns.

As another aspect of the invention, use of $CaCO_3$ rather than a CaO as the other Ca-containing compound leads to carbonate incorporation, increased F-HA content, and higher crystallinity.

As another aspect of the invention, the pH of the cement paste during setting, may be principally controlled by the pH of the cement liquid to promote F-HA formation.

These and other objects, aspects and features are set forth in the description which follows.

BRIEF DESCRIPTION OF THE DRAWING

In the detailed description which follows reference will be made to the drawing comprised of the following Figures.

FIG. 6 is a series of photographs depicting the histopathological features of CPCs wherein photo A depicts CPC0, photo B depicts FA-CPC1, photo C depicts FA-CPC2 and photo D depicts FA-CPC3. The portions of the photo are identified as follows:
Implanted Material (IM),
Fibrous Connective Tissue (FCT),
Giant Cell (GC),
Granulation Cell (GT),
Uncalcified Material (UM), and
Infiltrated Cell (IC);

FIG. 13 comprises x-ray patters of DCPAs-TTCPS cements after 20 hour incubation in PLS at 37° C.

DETAILED DESCRIPTION OF EMBODIMENTS OF THE INVENTION

Figure 1:
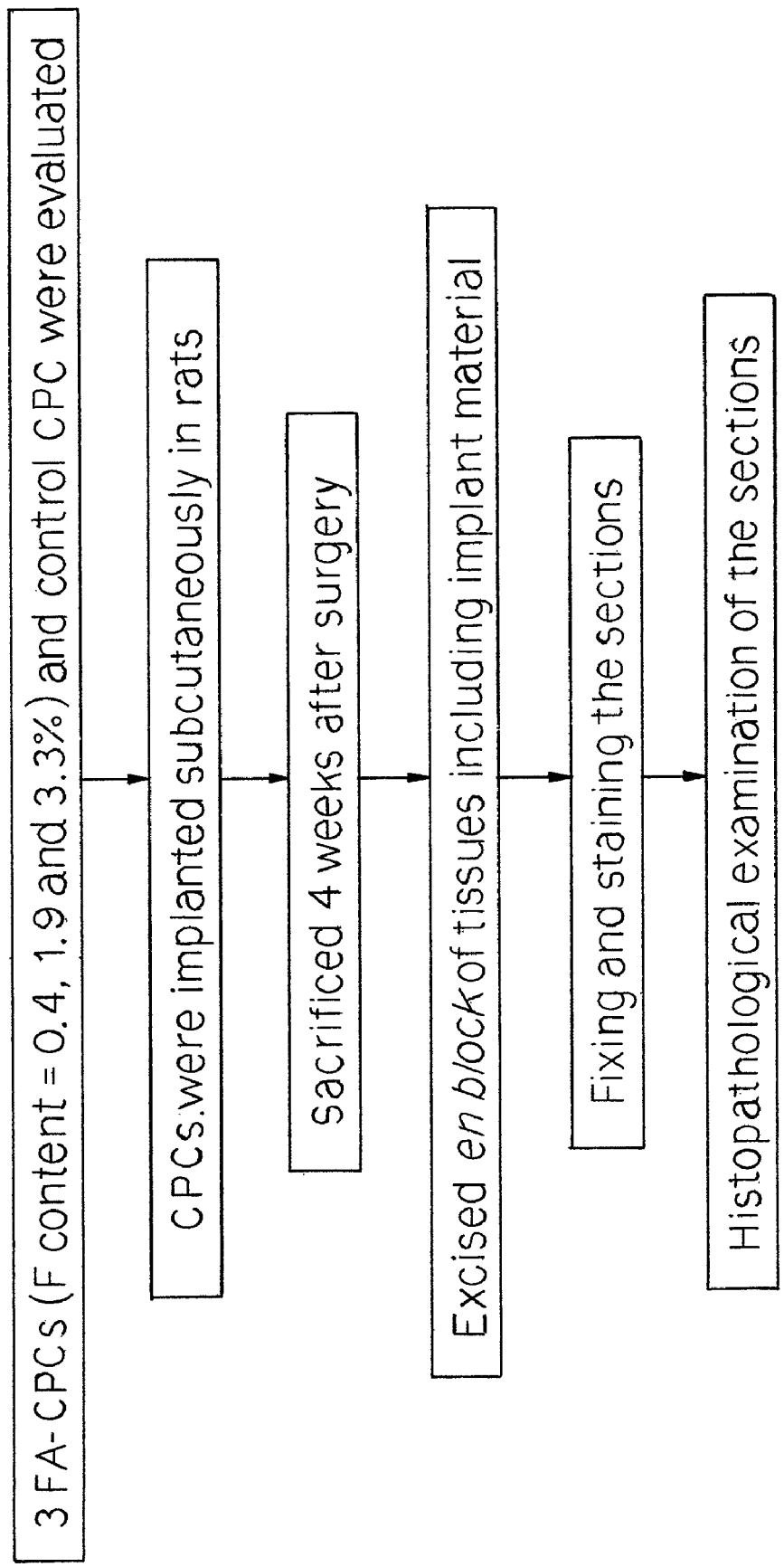
FIG. 1 is a flow diagram illustrating the experimental procedure employed in the animal studies reported in the detailed description.

The cement material of the invention comprises a mixture of a powder which includes DCPA, DCPD or a combination thereof along with a calcium phosphate in powder form selected from a group of such materials alone or in combination: e.g. TCP, BTCP, ACP, TTCP and optionally, CaO and $CaCO_3$. The powder is mixed with a solution to form a paste. The solution typically contains selected, dissolved fluoride compounds. A series of studies exemplifies the compositions, their properties and their utility as biosorable or non-biosorable as well as an appropriate crystalline and/or chemical form or structure.

When a soluble F, e.g., NaF, is added to either the solid or solution phase of the CPC ingredients, F will be present in the hardened CPC material in three possible forms: (1) F incorporated into the structure of the apatitic CPC product, forming either FA or F-substituted HA, (2) F present in the form of calcium fluoride ($CaF_2$) or phosphate-contaminated $CaF_2$ which is known as "$CaF_2$-like" material, and (3) F that is essentially unreacted or loosely absorbed on the CPC product and therefore present in a highly labile form.

The carbonate content and crystallinity of the apatite products formed in these F-containing CPC materials are also controllable. These factors affect resorption and osteoconductive properties of the CPC materials.

Because FA and F-substituted HA are considerably less soluble than HA under acidic physiological-like environment, the F-containing materials can be expected to be less resorbable than HA in vivo. Resorbability of CPC materials implanted subcutaneously in rats decreased significantly with increasing FA content. Therefore F-substitution can be an additional means for controlling resorption rate. In contrast to FA and F-substituted HA, the F present in the form of $CaF_2$ is expected to be slowly released into the surrounding tissues under normal physiological conditions, which may affect osteoconductivity of the CPC bone graft. Thus, the disclosed F-containing CPC materials with different forms of F incorporation, apatite crystallinity and carbonate content can provide significant additional control of osteoconductivity and resorption rate that are of importance to clinical applications as discussed herein.

Following are the results of multiple studies in vitro and in vivo with respect to materials compositions and processing protocols.

Study 1 and Study 2—In Vitro and In Vivo Study of FA-CPCs

TABLE 1

Acronyms used in Study 1 and Study 2

| | |
|---|---|
| Calcium Phosphate Cement | CPC |
| Dicalcium phosphate anhydrous | DCPA |
| Dicalcium phosphate dihydrate | DCPD |
| Fluorapatite | FA |
| Fibrous connective tissue | FCT |
| Giant cell | GC |
| Granulation Tissue | GT |
| Hydroxyapatite | HA |
| Infiltrated cell | IC |
| Implanted Material | IM |
| Tetracalcium phosphate | TTCP |
| Uncalcified material | UM |

Study 1—Characterization of Composition

CPC powder used in the study was a CPC consisting of equimolar amounts of tetracalcium phosphate (TTCP), $Ca_4(PO_4)_2O$ and dicalcium phosphate anhydrous (DCPA). $CaHPO_4$. TTCP was prepared by heating an equimolar mixture of commercially obtained DCPA (Baker Analytical Reagents, J.T. Baker Chemical Co., Phillipsburg, N.J.) and $CaCO_3$ (J.T. Baker Chemical Co.) at 1500° C. for 6 h in a furnace and quenched at room temperature. All chemicals were reagent grade and used as received. The TTCP and DCPA powders were ground individually in a planetary ball mill (PM4, Brinkman, N.Y.). The TTCP was ground dry and DCPA was ground in 95% ethanol for 24 h to obtain the desired median particle sizes. The particle sizes of TTCP and DCPA were measured using a centrifugal particle size analyzer (SA-CP3, Shimadzu, Kyoto, Japan) with an estimated standard uncertainty of 0.2 μm. The median particle sizes of TTCP and DCPA used in this study were 17 μm and 1 μm, respectively.

Cement liquid was a 2 mol/L $H_3PO_4$ solution containing either 1 mol/L (L1), 4 mol/L (L2) or 8 mol/L (L3) hydrogen fluoride (HF) (B&A, Industrial Chemical Division, Morristown, N.J.).

Three experimental FA-forming CPCs, (FA-CPC1, FA-CPC2 and FA-CPC3) were prepared by mixing the CPC powder with the L1, L2 or L3 liquid at a powder to-liquid ratio (P/L) of 2. At this P/L ratio, the amount of F supplied by the cement liquid would account for approximately (0.5, 2, and 4) mass % of the total solid mass, compared to the theoretical F content of pure FA of 3.8 mass %. Control CPC(CPC0) was prepared by mixing the CPC powder with the 2 mol/L $H_3PO_4$ solution without HF at P/L=2.

The three experimental FA-forming CPCs, (FA-CPC1, FA-CPC2 and FA-CPC3) and the control CPC, (CPC0), were prepared by mixing the respective powder and liquid on a Teflon slab for 20 s. After mixing the pastes were placed in stainless steel molds (6 mm D, 3 mm H) for 1 h. Hardened FA-CPCs were removed from molds and immersed for 23 h in a physiological-like solution (PLS) containing 1.15 mmol/L Ca, 1.2 mmol/L P, 133 mmol/L NaCl, 50 mmol/L HEPES, and pH adjusted to 7.4. The fluoride (F), calcium (Ca), and phosphate (P) contents of the 24 h FA-CPCs were determined by dissolving the sample in 0.5 mol/L $HClO_4$ and the acid solution was analyzed for F using a specific ion electrode, and Ca and P using spectrophotometric methods. The phases present in the 24 h FA-CPCs were characterized by powder x-ray diffraction (XRD). The XRD patterns were recorded (Rigaku DMAX 2200, Danvers, Mass., U.S.A.) using graphite-monochromatized CuKα radiation (λ=0.154 nm) generated at 40 kV and 40 mA. The specimen was scanned from (20° to 40°) 2θ in a continuous mode (2° 2θ $min^{-1}$, time constant 2 s). The surface morphology was observed using scanning electron microscopy (SEM) (JEOL JSM-5300, JOEL U.S.A., Inc., Peabody, Mass.) under the condition of 15 kV and 58 mA.

In this study, the standard deviation is considered as the standard uncertainty for all experimentally measured values.

In a separate experiment, fully cured FA-CPC3 (formulation with the highest F content) samples were analyzed using the KOH extraction method of Caslayska [Caslayska et al. (1975)[12]] for the amounts of F present in the sample in two possible forms: (1) F incorporated into the apatite crystal structure and (2) F present in the form of calcium fluoride.

[12] Caslayska V, Moreno E C, Brudevold F (1975). Apatitic fluoride produced by various topical fluoride treatments (abstract 541). J Dent. Res (special issue A):54, 180.

Results—Study 1

The KOH extraction experiment revealed negligible amounts of KOH extractable F in the FA-CPC3 samples, indicating that all of the F was incorporated into the apatite structure. The measured F contents in the three FA-forming CPCs were (0.4, 1.8, and 3.1) mass % (Table 2), which are close to the expected values of (0.5, 2, and 4) mass %, respectively. The molar Ca/P ratio of the samples, which ranged from (1.37 to 1.69), increased with increasing F content (Table 2).

TABLE 2

Fluoride Content and Ca/P Ratio

| Sample | F content (mass %) (Mean ± sd; n = 2 | Ca/P molar ratio (mean ± sd; n = 2 |
|---|---|---|
| CPC0 | 0 | 1.37 ± 0.05][a] |
| FA-CPC1 | 0.4 ± 0.1 | 1.42 ± 0.04] |
| FA-CPC2 | 1.8 ± 0.2 | 1.53 ± 0.06] |
| FA-CPC3 | 3.1 ± 0.2 | 1.69 ± 0.07[b] |

[a]Values connected by a line are not significantly (p > 0.05) different.
[b]Significantly different (p > 0.05) from other Ca/P values.

Figure 4:
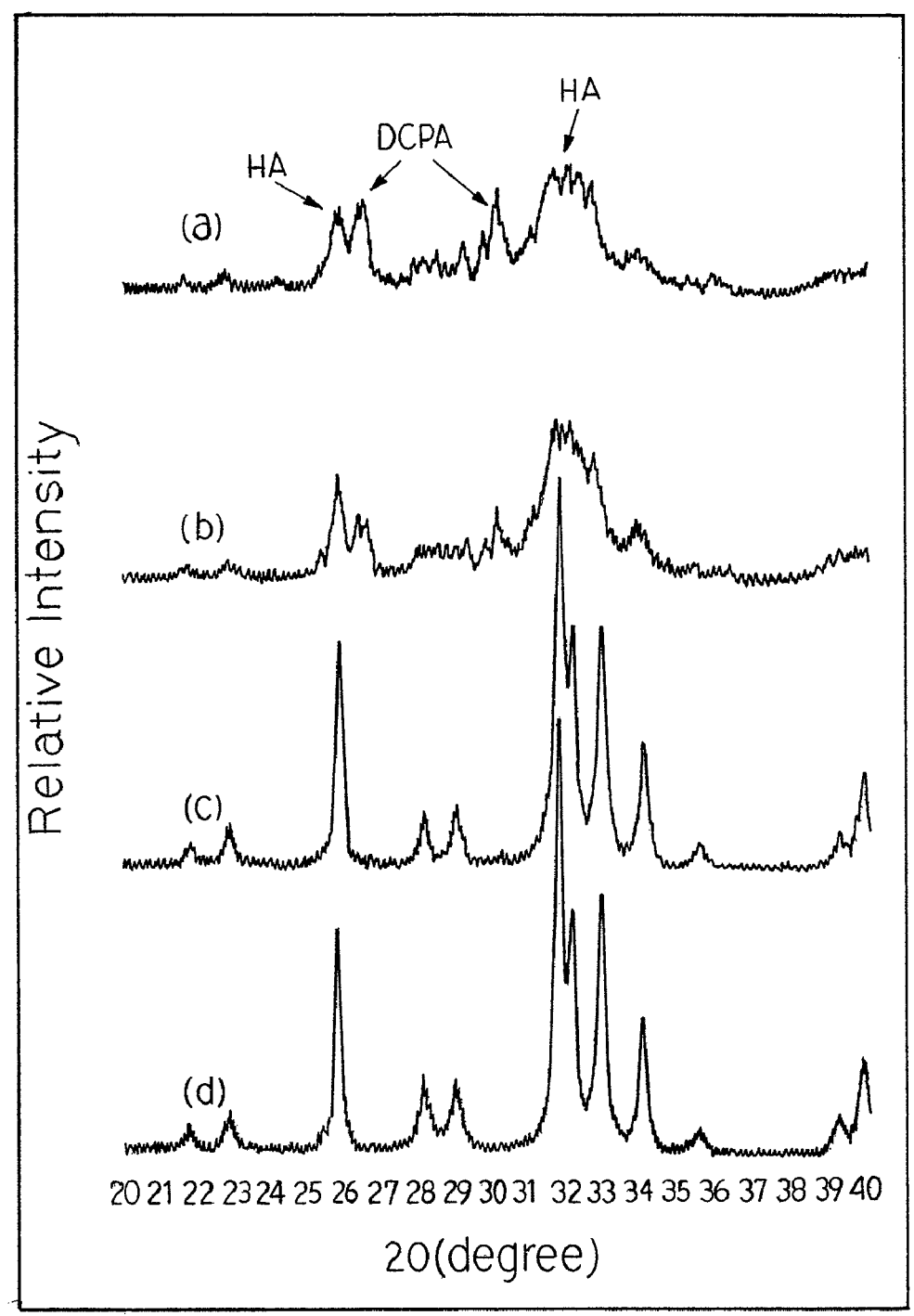
FIG. 4 is a powder x-ray diffraction pattern of various CPCs wherein pattern (a) is directed to CPCO, pattern (b) is directed to FA-CPC1, pattern (c) is directed to FA-CPC2 and pattern (d) is directed to FA-CPC3 as discussed in the detailed description.

The powder XRD pattern of the control, CPC0, showed that the sample contained poorly crystalline HA and unreacted DCPA (peaks at 30.19°, 26.59°, and 26.43° 2θ) (FIG. 4). The presence of the latter can be attributed by the use of the highly acidic and phosphate-rich cement liquid (2 mol/L $H_3PO_4$), which preferentially consumed TTCP, leaving some DCPA unreacted. The powder XRD pattern of FA-CPC1 is similar to that of CPC0, but with somewhat better crystalline HA and less unreacted DCPA. In contrast, FA-CPC2 and FA-CPC3 showed highly crystalline apatitic materials as the only phase present. The XRD patterns show that the crystallinity increased with increasing HF concentration of the cement liquid.

Figure 5A:
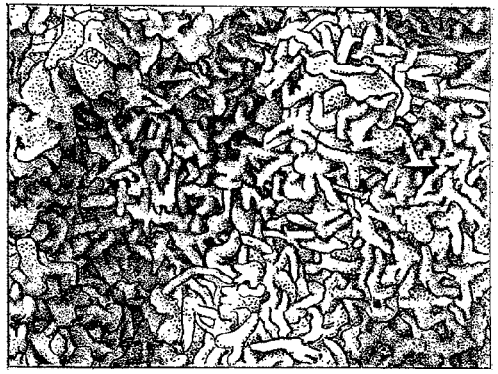
FIG. 5 comprises a series of micro-photos depicting the surface morphology of various CPC specimens wherein photo A depicts the flat surface of CPC0, photo B depicts the fractured surface of CPC0, photo C depicts the flat surface of FA-CPC3 and photo D depicts the fractured surface of FA-CPC3 as discussed in further detail in the detailed description.
Figure 5B:
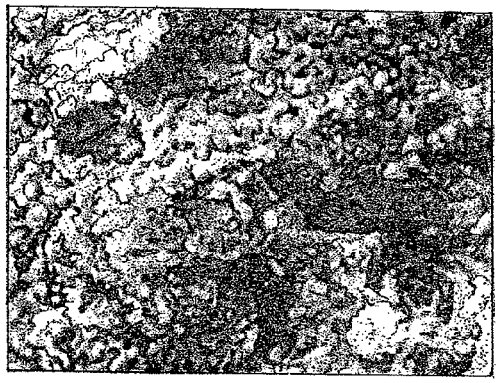
Figure 5C:
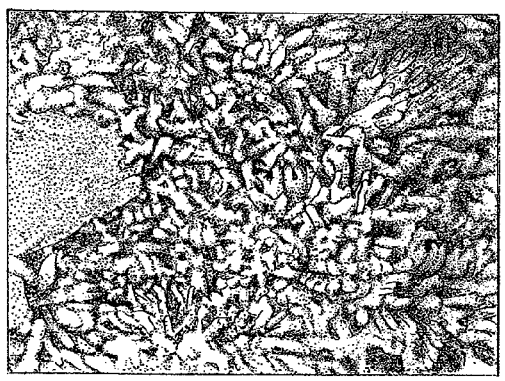
Figure 5D:
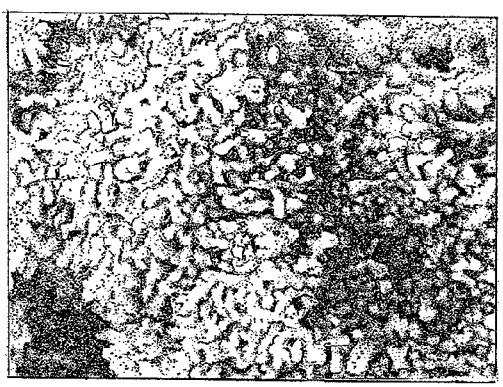

After 23 h incubation in PLS, both the FA-CPCs and control CPC samples were covered with plate and rod-shaped crystals (FIGS. 5a and 5c). Fractured surfaces of the control CPC0 showed small and less well-formed crystals, while FA-CPC3 showed mostly larger rod-like crystals. The F contents of the four CPC materials (Table 1) were (0, 0.4, 1.8 and 3.1) mass %. These correspond to the presence of FA in the cement products at levels of approximately (0, 10, 50, and 87) mass %. Results from the present study indicate that the F effects on crystallinity started to become highly pronounced somewhere between FA-CPC1 (10% FA) and FA-CPC2 (50% FA).

Discussion—Study 1

An equimolar mixture of TTCP and DCPA was used as the solid component of all of the CPC materials. The control CPC(CPC0), prepared by mixing the TTCP+DCPA powder with a F-free 2 mol/L $H_3PO_4$ solution, formed a poorly crystalline apatitic product together with some unreacted DCPA (FIG. 4a). The presence of unreacted DCPA in the present study was probably due to the high acidity of the cement liquid (2 mol/L $H_3PO_4$), leading to exhaustion of TTCP, the more alkaline component in the cement powder, before all DCPA could be reacted.

Inclusion of HF in the cement liquid produced two significant effects on the cement products. Firstly, the amount of unreacted DCPA decreased with increasing HF concentration. No unreacted DCPA was found in FA-CPC2 and FA-CPC3 (FIGS. 4c and 4d). Secondly, the crystallinity of the apatitic product increased greatly with increasing HF concentration. The powder XRD patterns (FIG. 4) showed that both FA-CPC2 and FA-CPC3 are highly crystalline apatitic materials, whereas CPC0 was a poorly crystalline apatite.

The present study demonstrates that CPCs may form FA as a significant phase in the product. In this study, HF was used as the F source to minimize the number of components in the cement system. However, this leads to high acidity of the cement paste during setting. NaF can also be used as a source of F. Further, FA-forming CPCs can be formulated from several different calcium phosphates powder mixtures that would have acidic, neutral, or alkaline properties during and after setting. The FA-CPCs may find clinical applications where slow or no in vivo resorption is desired.

Study 2—In Vivo Resorption Study Using a Rat Model

Figure 2:
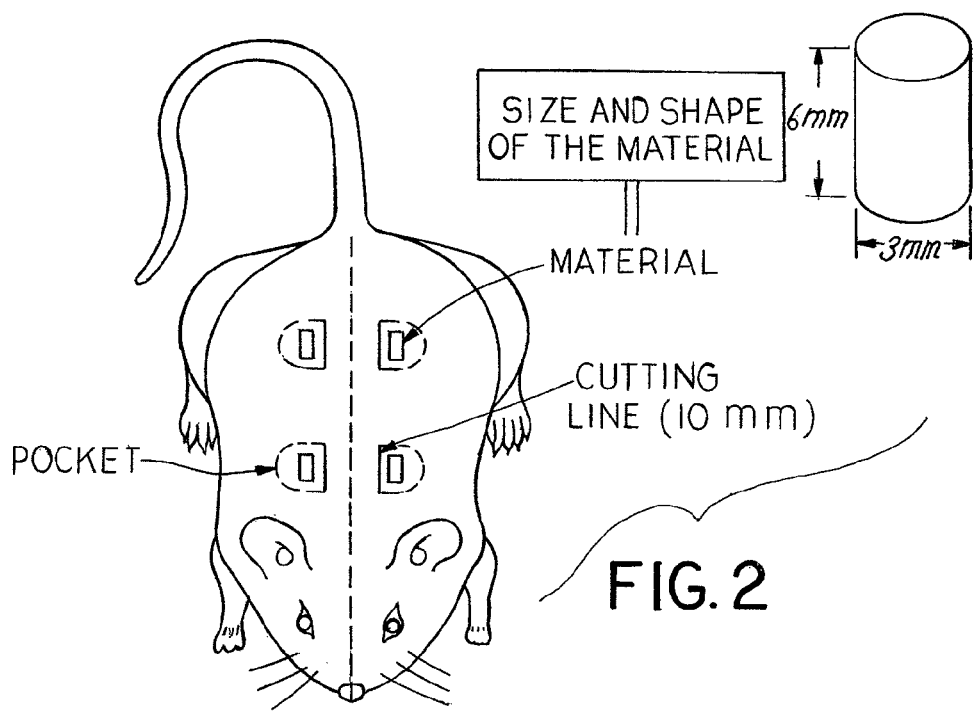
FIG. 2 is a schematic drawing of the animal study procedure of FIG. 1.
Figure 3A:
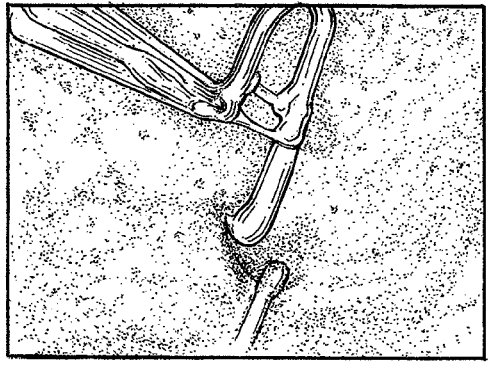
FIG. 3 comprises photos 3A and 3B illustrating the grafting procedure associated with the experimental procedure of FIG. 1.
Figure 3B:
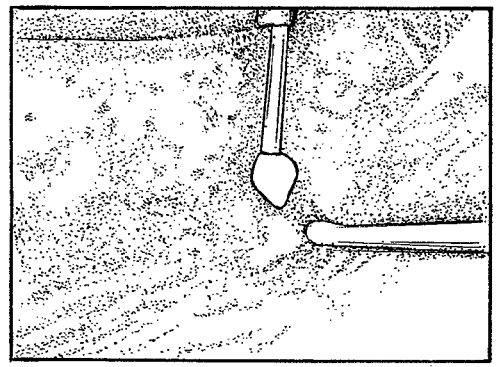

Animal experiments were conducted, with approval of the Animal Experimentation Committee at Nihon University School of Dentistry, in the animal and cell culture laboratories at Nihon University School of Dentistry. The study fully complied with the "Guidelines for Animal Experimentation Committee at Nihon University School of Dentistry" and with the NIH's "Standards for Humane Care and Use of Laboratory Animals by Foreign Institutions." Experimental protocols are shown in FIG. 1. Each experimental FA-CPC material was tested in five adult Donryu rats with an average body weight of 200 g to 250 g. All experimental procedures on given animals were completed under aseptic conditions. Each animal was anesthetized with a pentobarbital sodium injection at a dose of 1.5 mg/kg body weight. Under the general anesthesia, the back area of the rat was shaved and swabbed with 70% volume fraction ethanol. Four subcutaneous pockets were created, two on each side of the backbone, to implant the experimental CPCs. Four horizontal incisions approximately 15 mm in length were made along each side of the back bone, and subcutaneous skin pockets were created by blunt dissection (FIG. 2). The pockets were separated by 40 mm to 50 mm. Each cylindrical shaped sample (3 mm diameter and 6 mm length) was inserted into a pocket of subcutaneous tissues as shown in FIG. 3, and then the pocket was closed with interrupted sutures. Four weeks after surgery, the animals were sacrificed and the tissues including the test materials were excised en block.

Tissues were fixed in 10% neutralized-buffered formalin, decalcified with 10% formic acid for 14 d and embedded in paraffin. This decalcification period for the sample was longer than those of normal conditions. Subsequently, paraffin embedded blocks of decalcified specimens were cut into 3 μml to 4 μm cross-sections, and stained with hematoxylin and eosin.

Histopathological features of each specimen were observed using an optical microscope.

Results: Study 2

All FA-CPC implants, but not the control CPC0, retained the original cylindrical shape and were encapsulated by thin fibrous connective tissues (FCT) with small numbers of infiltrated cells (IC) (FIG. 6). Significant differences in tissue response to the four types of implants were noted as described below.

Study 2: CPC0 Samples (FIG. 6A)

Significant resorption of CPCO had occurred, and the implanted material (1M) was well separated into small domains which were covered by FCT. The remaining 1M was completely decalcified by the 14-d decalcification period in 10% formic acid conducted in the specimen preparation process. Small numbers of macrophage and foreign body giant cells (GC) were found adjacent to the material. Granulation tissues (GT) were also formed in the implant area. The tissue reaction of the material was mild.

Study 2: FA-CPC1 Samples (FIG. 6B)

FA-CPC1 resorbed considerably less than CPCO, but FCT was clearly formed throughout the implant area. Although the histopathological reactions of the surrounding tissues to FA-CPC1 were basically similar to the reaction to other FA-containing CPCs, inflammatory reaction was relatively few or negligible. The FCT surrounding the FA-CPC1 was very thin in comparison to the FCT formed over other experimental materials. Most of the 1M was decalcified, but small areas of the undecalcified material (UM) can be seen. The tissue reaction was extremely mild.

Study 2: FA-CPC2 Samples (FIG. 6C)

The implanted FA-CPC2, which consisted of approximately 50% FA, was surrounded by relatively thin and dense FCT. Slight resorption of the implanted material had occurred, resulting in FCT formation in highly confined spaces within some areas of the 1M. Less amount of FCT was formed compared to that observed in the FA-CPC1 group. Very few inflammatory cells were found adjacent to the material. Some UM was seen in the implant area. The tissue reaction of the material was very mild.

Study 2: FA-CPC3 Samples (FIG. 6D)

The implanted FA-CPC3, which has the composition of nearly pure FA, was not resorbed. The filling area was surrounded by relatively thick and dense FCT with small numbers of inflammatory cells. No FCT or other tissues were found within the implanted material. The implanted material remained completely un-dissolved by the decalcification step in the sample preparation, most likely due to the low acid solubility of FA. The tissue reaction of the material was gentle.

In general, all of the experimental FA-CPCs demonstrated good biocompatibility and shape-integrity when implanted in subcutaneous tissues Discussion: Study 2

Because of the high acidity and high initial HF concentration in the cement liquid, one may expect that implantation of the experimental FA-CPC pastes in subcutaneous tissues, would incite negative tissue reactions. The results obtained from the study showed that the histopathological reactions of FA-CPCs were nearly identical and similar to the CPC0 that did not contain HF. In all cases, the implanted CPC material was surrounded by FCT with either negligible or small numbers of inflammatory cells. All of the materials used in this study showed high biocompatibility.

Histopathological examination results showed a clear trend of in vivo resorption for the four experimental CPCs as follows. On the one end, the F-free CPC0 showed significant resorption, and the implanted material was well separated into small domains that were covered by FCT. On the other end, the implanted FA-CPC3, which had the composition of nearly pure FA, was not resorbed. No FCT or other tissues were found within the implanted material. The in vivo properties of the other 2 FA-CPCs fell in between the two extremes. The lack of resorption of FA-CPC3 is likely to be the result of its insolubility in the acidic environment produced by inflammatory or other giant cells.

This material thus comprises a calcium phosphate cement that is chemo-mechanically stable in soft tissues, making it a biocompatible and bioinert material. These bioinert CPCs may be used for applications where slow or no resorption of the implant is required to achieve desired clinical outcome.

Summary—Study 1 and 2: Fluorapatite Calcium Phosphate Cements

Materials and Methods: Various amounts of NaF powder were added to a conventional CPC powder consisting of equimolar amounts of tetracalcium phosphate (median size 17 µm) and dicalcium phosphate anhydrous (1.2 µm) to obtain F/Ca ratios of 0, 0.05, 0.10, 0.20 (stoichiometric ratio for FA) and 0.40. Samples for setting time (Gilmore needle method) and diametral tensile strength (DTS) measurements were prepared by mixing the cement powder with 0.5M phosphate (pH 5.6) solution at P/L=2.5. Porosity was determined from the dry weight of the set specimen.

Results: The setting times (mean±standard deviation; n=4) of the FA-CPCs with F/Ca ratios of 0, 0.05, 0.10, 0.20 and 0.40 were (13.8±2.5, 8.3±1.3, 8.3±1.7, 8.8±1.0, and 31.5±2.4) min, respectively. The DTS were (8.4±1.1, 4.5±0.4, 2.0±0.1, 1.3±1.4, and 0.13±0.01) MPa, respectively. The porosities were (35.5±1.8, 36.6±2.0, 38.0±1.5, 42.4±1.0, and 49.7±0.9) vol %, respectively. Total F contents were (0, 0.71±0.02, 1.28±0.04, 1.97±0.04, and 3.82±0.10) mass %, respectively.

Conclusions: FA can be formed as a product of CPC. ANOVA of the results showed significant (p<0.05) differences among the groups. The amounts of F incorporated into the CPC product increased with F/Ca ratio in the cement powder. F incorporation led to decreases in the setting time (except F/Ca ration of 0.4) and DTS, but increases in the porosity (except F/Ca ratio of 0.05 and 0.10) and crystallinity of the apatitic product. The material has a neutral pH rather than acidic pH, which is the case with the HF-containing CPCs described heretofore.

Summary—Study 1 and Study 2: Properties of DCPA+ CaO and DCPA+CaCO$_3$ Fluorapatite-Forming Calcium Phosphate Cements Presence of low levels of fluoride (F) in calcium phosphate bone grafts was shown to be desirable in promoting bone formation.

Materials and Methods: The cement powder consisted of 1 mole of NaF, 3 moles of either small (SDCPA, 2.1 µm medium size) or large (LDCPA, 10.8 µm) DCPA particles, and 2 moles of either CaO (4.5 µm) or CaCO$_3$ (2.6 µm). Samples for setting time (Gilmore needle method) and diametral tensile strength (DTS) measurements were prepared by mixing the cement powder with 0.5M phosphate solution (pH=5.6) at P/L=2.5. The apatitic F and CaF$_2$ contents were determined using previously described methods.

Results: The setting times (mean±standard deviation; n=4) of the SDCPA-CaO, LDCPA-CaO, SDCPA-CaCO$_3$ and LDCPA-CaCO$_3$ cements were: (9.5±1.0, 19.3±1.5, 14.5±1.0, and 56.3±4.8) min, respectively. The DTS were (1.5±0.3, 1.2±0.2, 1.7±0.4, and 4.0±0.4) MPa, respectively. The FA contents were (29.3±1.3, 48.1±11.4, 52.6±11.9, and 61.0±7.1) mass %, respectively. The CaF$_2$ contents were (2.2±0.2, 1.6±0.1, 0.42±0.18, and 0.25±0.02) mass %, respectively.

Conclusions: FA can be formed as a product of all the CPC compositions studied. Two-way ANOVA of the results show that both independent variables (DCPA size and CaO or CaCO$_3$) have significant (p<0.05) effects on all 4 measured variables. Compared to CaO, CaCO$_3$-containing compositions produced cements with high amount of FA with little CaF$_2$, high DTS, and higher crystallinity, but longer setting time.

Study 3 and Study 4: Quantative Characterization of Fluoride Present in Fluorapatite—Forming Calcium Phosphate Cements

DEFINITIONS

Fluoride substituted hydroxyapatite (F-HA)—F is known to substitute for the hydroxyl group in the apatite crystal structure. Thus, F-substituted HA may have the general formula of

$$Ca_{10}(PO_4)_6F_x(OH)_{2-x} \tag{1}$$

where $0 \leq x \leq 2$, and the formula represents pure HA when x=0, and pure FA when x=2.

Carbonate substituted hydroxyapatite (C-HA)—For reactions taken place at ambient temperatures, carbonate is known to substitute for the phosphate group of HA. This is known as the type-B carbonate incorporation. A general formula for carbonate-substituted HA is

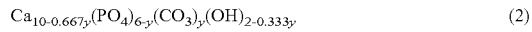
$$Ca_{10-0.667y}(PO_4)_{6-y}(CO_3)_y(OH)_{2-0.333y} \tag{2}$$

Alternatively, since sodium is readily incorporated into the apatite structure by replacing a Ca ion, carbonated apatite may be described by the following formula when formed in the presence of sodium ions:

$$Ca_{10-y}Na_y(PO_4)_{6-y}(CO_3)_y(OH)_2 \tag{3}$$

Calcium-deficient hydroxyapatite (Ca-dHA)—Even in the pure 3-component system [Ca(OH)$_2$—H$_3$PO$_4$—H$_2$O] where neither F nor carbonate was present, Ca-deficient HA instead of pure HA is the more likely phase to form. The Ca-deficient HA may be described by the formula,

$$Ca_{10-0.5z}H_z(PO_4)_6(OH)_2 \tag{4}$$

Ca-deficient, fluoride and carbonate-substituted HA—The apatitic phase present in the F-containing CPCs described is likely to be a combination of all three of the above identified apatite phases and can be described by the formula,

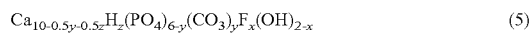
$$Ca_{10-0.5y-0.5z}H_z(PO_4)_{6-y}(CO_3)_yF_x(OH)_{2-x} \tag{5}$$

Since F substitution is the key property to be described for simplicity the term "F-HA", defined earlier (Eq. 1) as F-substituted HA, will be used to represent the Ca-deficient, carbonate-containing, and F-substituted HA with or without Na incorporation.

Phosphate contaminated calcium fluoride (CaF$_2$)—When CaF2 is precipitated in the presence of phosphate, phosphate is known to be incorporated into the precipitate as an impurity. This phase is known as a $CaF_2$-like material, which has a greater thermodynamic solubility than that of the pure $CaF_2$.

Experimental Protocol and Results

Materials and Methods: Various amounts of NaF was added to a CPC powder consisting of equimolar amounts of $Ca_4(PO_4)_2O$ and $CaHPO_4$ to obtain F/Ca molar ratios of 0.05, 0.10, 0.20, and 0.40. CPC specimens (6 mm dia×3 mm height) were prepared by mixing the powder with a 0.5 mol/L phosphate (pH5.6) solution at P/L=2.5. Three types of F present in the set specimen were determined by sequential extractions: (1) Unreacted F was determined from the amount of F extractable by a pH 7.4 physiological-like solution, (2) F in the form of $CaF_2$ was determined from F extractable by 1M KOH solution, and (3) Apatitic F was the F remained in the specimen after the extractions.

Results: The FA content (mean±standard deviation; n=4) of the specimens prepared from CPC powders with F/Ca ratios of 0.05, 0.10, 0.20 and 0.40 were (18.5±1.3, 31.2±1.9, 34.4±1.7, and 31.0±2.0) mass %, respectively. The $CaF_2$ contents were (0.02±0, 0.2±0.02, 1.38±0.13, and 5.43±0.37) mass %, respectively. The unreacted F accounted for (0.41±0.03, 6.9±0.7, 29.8±1.6, and 38.7±0.7) mass %, respectively, of the F initially present in the cement powder.

Conclusions: Both FA and $CaF_2$ were formed in CPCs that initially contained NaF in the cement powder as the source of F. ANOVA of the results showed significant ($p<0.05$) differences among the groups. Higher F/Ca ratio led to increases in the amounts of unreacted F, $CaF_2$, and FA, but the FA content reached a plateau at F/Ca=0.20. Because the two compounds have quite different solubilities, $CaF_2$ can slowly release F into the surrounding physiological fluids while FAp cannot except under highly acidic pH conditions.

The results obtained from the present studies also demonstrate that FA-CPCs are highly biocompatible with subcutaneous tissues. The resorption rate of FA-CPCs appears to decrease with increasing FA content, and suggests that the FA-CPC3, which has a composition of nearly pure FA, is non-resorbable in vivo.

Following are composition and material processing studies

Study 3—Properties of (DCPA+CaO+NaF) and (DCPA+$CaCO_3$+NaF) Fluorapatite-Forming Calcium Phosphate Cements Materials:

Commercially obtained dicalcium phosphate anhydrous (DCPA, Baker Analytical Reagents, J.T. Baker Chemical Co., Phillipsburg, N.J.) was ground in a planetary ball mill (Retsch PM4, Brinkman, N.Y.) in 95% ethanol to produce a batch of small DCPA (DCPAs) with a median particle size of 1.0 μm and a batch of medium DCPA (DCPAm) with a median size of 2.1 μm. A batch of large DCPA (DCPAf) with a median particle size of 10.8 μm was produced by grinding the commercial DCPA in a blender.

CaO (J.T. Baker) was used as received (4.5 μm) and $CaCO_3$ (J.T. Baker) was ground in the ball mill in 100% ethanol to obtain a median particle size of 2.6 μm.

Tetracalcium phosphate (TTCP) was prepared by heating an equimolar mixture of the commercial DCPA and $CaCO_3$ at 1500° C. for 6 h in a furnace and quenched at room temperature. The TTCP was ground dry to produce a batch of large TTCP (TTCPl) with a median size of 20.4 μm or in cyclohexane to produce a batch of small TTCP (TTCPs) with a median size of 4.0 μm.

The particle sizes of all powders were measured using a centrifugal particle size analyzer (SA-CP3, Shimadzu, Kyoto, Japan) with an estimated standard uncertainty of 0.2 μm. Table 3 shows the various calcium phosphate compounds of different sizes prepared for formulating the cements.

TABLE 3

Calcium phosphate compounds of various particle sizes used for formulating CPCs

| Compound | median particle size (μm) |
|---|---|
| DCPAl | 10.8 |
| DCPAm | 2.1 |
| DCPAs | 1.0 |
| TTCPl | 20.4 |
| TTCPs | 4.0 |
| CaO | 4.5 |
| $CaCO_3$ | 2.6 |

The particles sizes of the various powders are summarized in Table 3. Four cements powder mixtures were prepared using these powders and NaF. Their compositions are described in Table 4. All mixtures had a Ca:P:F molar ratio of 5:3:1, the ratio for FA.

TABLE 4

Composition of the cement mixtures

| Cement mixture | Composition |
|---|---|
| DCPAm-CaO | 3 mole DCPAm + 2 moles CaO + 1 mole NaF |
| DCPAm-$CaCO_3$ | 3 mole DCPAm + 2 moles $CaCO_3$ + 1 mole NaF |
| DCPAl-CaO | 3 mole DCPAl + 2 moles CaO + 1 mole NaF |
| DCPAl-$CaCO_3$ | 3 mole DCPAl + 2 moles $CaCO_3$ + 1 mole NaF |

A 0.5 mol/L sodium phosphate (pH 5.6) solution, prepared by diluting a commercially obtained phosphate solution (Sodium Phosphates Inj, USP, Abbott Labs, N. Chicago, Ill.), was used as the cement liquid in all cases.

Experimental Design:

The DCPA particle size (DCPAm or DCPAf) and the choice of CaO or $CaCO_3$ were the two independent variables in this study. The measured or observed properties included cement setting time (ST) and the following properties of the set cement specimens: diametral tensile strength (DTS), porosity, F contents (in three different forms), carbonate contents, and crystallinity of the apatite phase.

Methods:

Setting time (ST), Diametral Tensile Strength (DTS) and Porosity Measurements

All samples for the setting time (ST), diametral tensile strength (DTS), and porosity measurements were prepared by mixing cement powder and liquid at the powder (g)/liquid (mL) ratio (P/L) of 2.5 to produce a cohesive paste. The paste was packed into a stainless steel mold (6 mm diameter×3 mm height) for ST measurement, which was performed using the Gillmore needle method [ADA specification #9[13]]. Samples for DTS and porosity measurements were prepared using a previously reported method [Chow et al, 2000[14]; Takagi and Chow, 2001[15]]. The samples were left in the mold in 100% relative humidity box at 37° C. for 4 h and then removed from the mold and placed in 10 mL of a physiological-like solution (PLS) at 37° C. for 20 h [Takagi and Chow, 2001[15]]. DTS values were measured using a Universal Testing Machine (Model 1122, Instru-Met Corporation, Union, N.J.) at a crosshead speed of 10 mm/min. The porosity was determined from the calculated density, $D_{specimen}$, of the specimen using Eq. 1 [Takagi and Chow, 2001].

[13] ADA specification No. 9 for dental silicate cement. In: Guide to dental materials and devices. 7th ed. Chicago, Ill.: American Dental Association; 1974/1975. p 194-202.

[14] Chow L C, Hirayama S, Takagi S, Parry E (2000). Diametral tensile strength and compressive strength of a calcium phosphate cement: effect of applied pressure. J Biomed Mater Res (Appl Biomater) 53B:511-517.
[15] Takagi S, Chow L C (2001). Formation of macropores in calcium phosphate cement implants. J Mater Sci: Mater in Medicine 12:135-139.

$$((D_{HA} - D_{specimen})/D_{HA}) \times 100 \quad (6)$$

where $D_{HA}=3.14$ g/cm$^3$ is the crystal density of HA [Lehr et al, 1967[16]] and $D_{specimen}$ was obtained from the measured sample mass divided by the sample volume calculated from measured sample dimensions.

[16] Lehr J R, Brown B H, Frazier A W, Smith J P, Thrasher R D (1967). Chemical Engineering Bulletin 6; 95.

Phase Characterization and Surface Morphology of the Set Specimen

Reaction products of the samples were identified by powder X-ray diffraction (XRD) (D/MAX 2200V, Rigaku, Danvers, Mass.). The estimated standard uncertainty of the 20 measurement was 0.01° and the minimum mass fraction of a crystalline phase to be detected by XRD in the present system was about 3 wt % [Takagi and Chow, 2001[15]]. Surface morphology was characterized by scanning electron microscopy (SEM) (JSM-5300, JOEL, USA, Peabody, Mass.).

Determination of Cement Fluoride (F) Contents

The amounts of the three possible types of F present in the CPC specimens were quantitatively determined using the following sequential steps:

(1) Unincorporated F—This was determined from the amount of F found in the pH7.4 physiological-like solution in which the sample was incubated for 20 h after removal from the mold. This was the amount of F that was not chemically incorporated into CPC products and therefore is labile enough to leach into the incubation solution.

(2) F in the form of CaF$_2$ or CaF$_2$-like forms—This was determined using the method of Caslayska et al [1975[12]]. After removed from the incubation described in step (1) above, the CPC specimen was thoroughly dried and finely ground. About 100 mg of the ground powder was suspended in a 100 mL of 1M KOH solution under vigorous stirring for 24 h. Because FA and F-HA are insoluble in KOH, whereas CaF2 is soluble, the F extracted by the KOH was in the form of CaF$_2$ initially present in the CPC specimen.

(3) F incorporated into the apatitic structure of the cement products—This was the F remained in the powder after the KOH extraction in step (2) above.

Statistical Analysis:

Two-way ANOVA (Kwikstat, Texas Soft, Cedar Hill, Tex.) was performed on ST, DTS, and porosity data with DCPA size and the choice of CaO or CaCO$_3$ as the independent variables. For each measured quantities described in this paper, the standard deviation is used as a measure of the standard uncertainty of that variable.

Results:

Setting time (ST), diametral tensile strength (DTS), and porosity

The mean ST, DTS and porosity of the four cements are shown in Table 5a. The ANOVA results are given in Table 5b.

For the ST and DTS data, both independent variables, i.e., DCPA size and choice of CaO or CaCO$_3$, as well as their interactions are significant (p<0.05). As a result, the ST of all four cements were significantly (p<0.05) different, with the DCPAm-CaO cement having the shortest ST and the DCPAf-CaCO$_3$ cement having the longest ST. The slowest setting DCPAf-CaCO$_3$ cement exhibited the highest DTS value (Table 5a), being more than twice the DTS values of the other three groups, which were not significantly different (p>0.05).

In terms of porosity, only the DCPA size and not the choice of CaO or CaCO$_3$ produced a significant effect. Comparison of the marginal means showed that the DCPAm-containing cements exhibited a significantly higher porosity than the corresponding DCPAl-containing cement.

TABLE 5a

Mean ST (min), DTS (MPa) and porosity (vol %) of F-containing CPCs (mean ± standard deviation).

|  |  | CaO | CaCO$_3$ |
|---|---|---|---|
| ST | DCPAm | 9.5 ± 1.0 | 14.5 ± 1.0 |
| (n = 4) | DCPAl | 19.3 ± 1.5 | 56.3 ± 4.8 |
| DTS | DCPAm | 1.5 ± 0.3 | 1.8 ± 0.4 |
| (n = 6) | DCPAl | 1.2 ± 0.2 | 4.0 ± 0.4 |
| Porosity | DCPAm | 54.4 ± 1.4 | 55.6 ± 1.2 |
| (n = 6) | DCPAl | 51.8 ± 0.8 | 51.6 ± 0.7 |

Values connected by a horizontal or vertical line are not significantly different (p > 0.05).

Values connected by a horizontal or vertical line are not significantly different (p>0.05).

TABLE 5b

| Source | Significance, p value |
|---|---|
| Two-way ANOVA results, main effect and interactions on ST or DTS | |
| CaO or CaCO$_3$ | <0.001 |
| DCPA size | <0.001 |
| Interaction | <0.001 |
| Two-way ANOVA results, main effect and interactions on porosity | |
| CaO or CaCO$_3$ | 0.302 |
| DCPA size | <0.001 |
| Interaction | 0.119 |

Amounts of F in Three Different Forms

Mean values (mass %) of the three type of F present in the cements are shown in Table 6a, The ANOVA results (Table 6b) showed the effects of the independent variables on each type of the F contents as follows.

Unreacted F—Both independent variables, i.e., DCPA size and the choice of CaO or CaCO$_3$, as well as their interactions produced significant effects (p<0.05). The DCPAl-CaO cement contained the highest amount of unreacted F, while the two CaCO$_3$-containing cements, with either DCPAm or DCPAl as the other ingredient, had the lowest unreacted F content. In general, the set cement product contained only a very small amount (0.07% to 0.23%) of the F in the form of unreacted F.

F in the form of CaF$_2$—Both of the independent variables but not their interactions produced significant (p<0.05) effects. As a result, the CaF$_2$ type F contents were different among all 4 groups, with the DCPAm-CaO cement containing the highest (2.16%) and the DCPAl-CaCO$_3$ cement the lowest (0.25%) amounts of F in the form of CaF$_2$. These results show that the amount of this form of F in the cement product can be affectively controlled by both the DCPA size and the choice of CaO and CaCO$_3$.

F incorporated into the apatitic structure—Only the choice of CaO or CaCO$_3$ produced a significant (p<0.05) effect. Comparison of the marginal means showed that the CaCO$_3$-containing cements had a significantly higher apatitically-bound F content than the corresponding CaO-containing cements.

Effects of F on Crystallinity of the CPC Products

Figure 7:
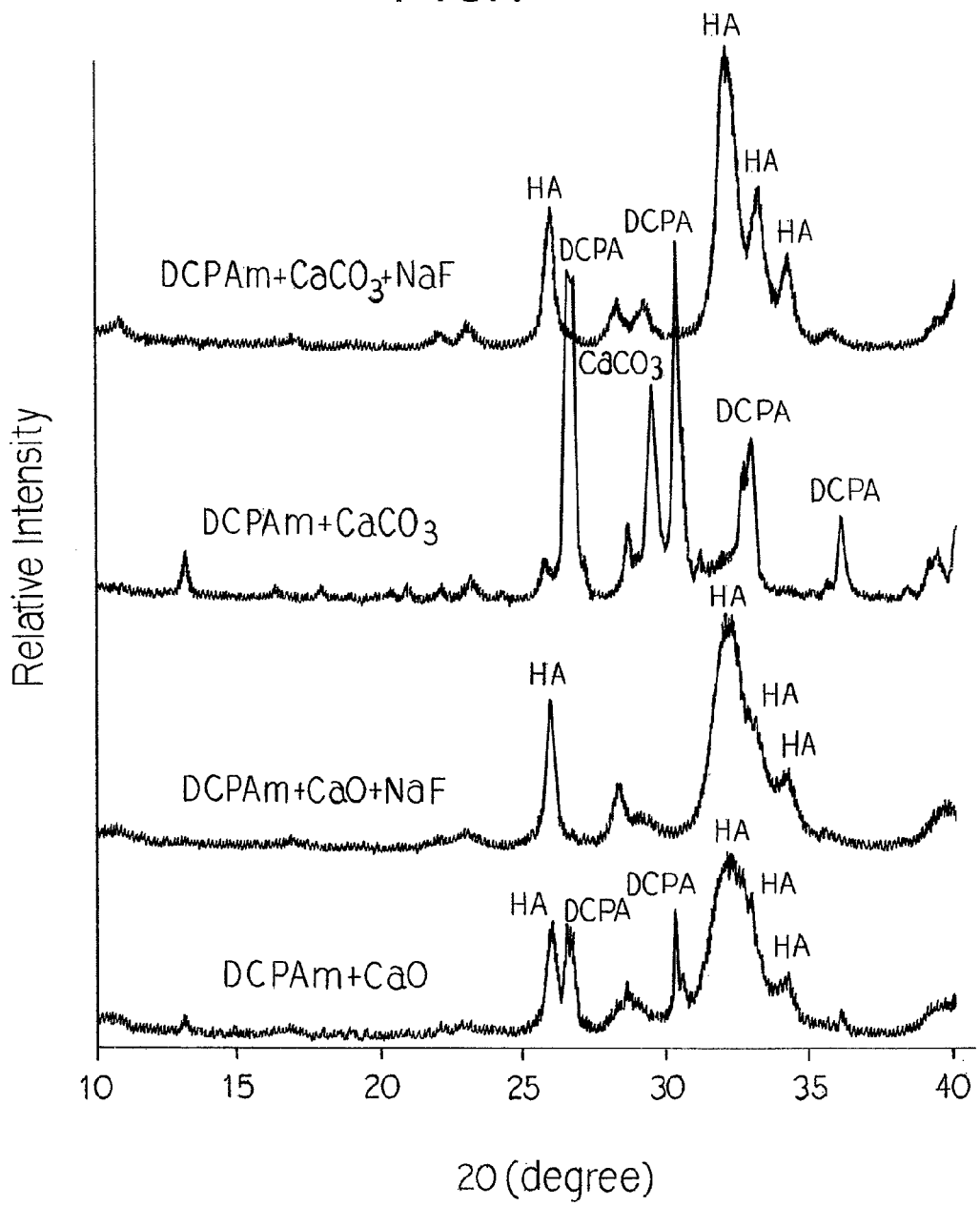
FIG. 7 sets forth x-ray diffraction patterns of DCPAm-CaO and DCPAm-$CaCO_3$ cements illustrating that a significantly larger amount of higher crystal and apatite was formed when NAF is present.
Figure 8A:
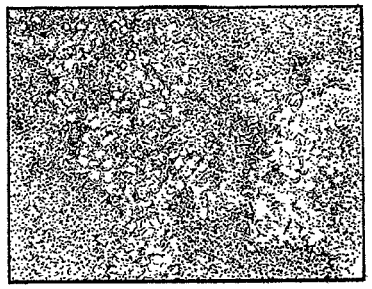
FIGS. 8A-8D are a series of SEM of DCPAl-CAO cement showing higher HA crystals formed in the presence of NAF.
Figure 8B:
Figure 8C:
Figure 8D:
Figure 9:
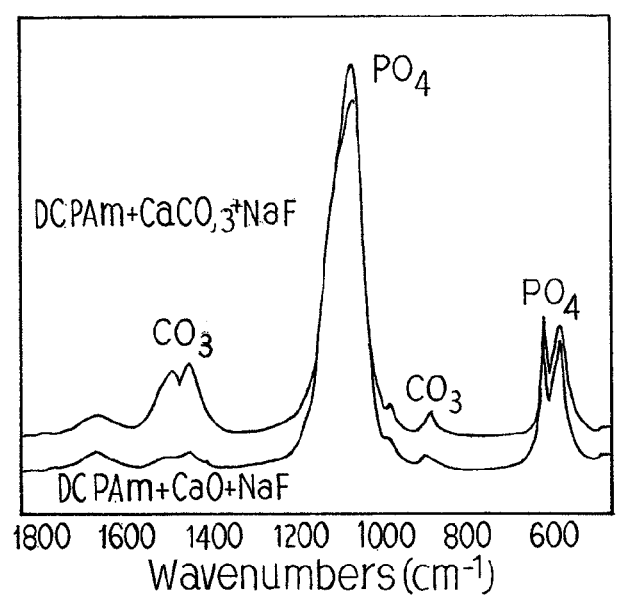
FIG. 9 is an FTIR of the DCPAm-CaO and DCPAm-$CaCO_3$ cements showing the later contained a significantly higher amount of type-B carbonate incorporation into the apatite structure.

As described above, F-HA can be formed as a product of all the CPC composition studied. The XRD (FIG. 7) revealed that in the absence of F, the DCPAm-CaCO$_3$ cement formed little HA product while the DCPAm-CaO cement formed some low crystalline HA. In the presence of F, the DCPAm-CaCO$_3$ cement was nearly completely converted to high crystalline F-HA, while the DCPAm-CaO cement was nearly completely converted to low crystalline F-HA. The XRD results thus showed that the presence of F led to formation of significantly greater amounts of higher crystalline apatite products. SEM examination results (FIG. 8) showed that in the presence of NaF, the DCPAl-CaO cement exhibited larger crystals than in the absence of F.

TABLE 6a

Mean values (mass %) of unreacted, CaF$_2$-like F, apatitically-bound F (mean ± standard deviation; n = 3) present in the F-containing CPCs.

|  |  | CaO | CaCO$_3$ |
|---|---|---|---|
| Unreacted F | DCPAm | 0.17 ± 0.01 | 0.08 ± 0.01 |
|  | DCPAl | 0.28 ± 0.03 | 0.08 ± 0.01 |
| CaF$_2$-like F | DCPAm | 1.25 ± 0.06 | 0.28 ± 0.03 |
|  | DCPAl | 0.98 ± 0.05 | 0.14 ± 0.00 |
| Apatitic F | DCPAm | 1.96 ± 0.05 | 2.56 ± 0.38 |
|  | DCPAl | 2.12 ± 0.22 | 2.70 ± 0.32 |

Values connected by a horizontal or vertical line are not significantly different (p > 0.05).

TABLE 6b

| Source | Significance, p value |
|---|---|
| Two-way ANOVA results, main effect and interactions on Unreacted F | |
| CaO or CaCO$_3$ | <0.001 |
| DCPA size | <0.001 |
| Interaction | <0.001 |
| Two-way ANOVA results, main effect and interactions on CaF$_2$-like F | |
| CaO or CaCO$_3$ | <0.001 |
| DCPA size | <0.001 |
| Interaction | 0.007 |
| Two-way ANOVA results, main effect and interactions on Apatitic F | |
| CaO or CaCO$_3$ | 0.021 |
| DCPA size | 0.395 |
| Interaction | 0.942 |

Control of the Carbonate Content and Crystallinity of the F-HA Formed in CPC

Figure 10:
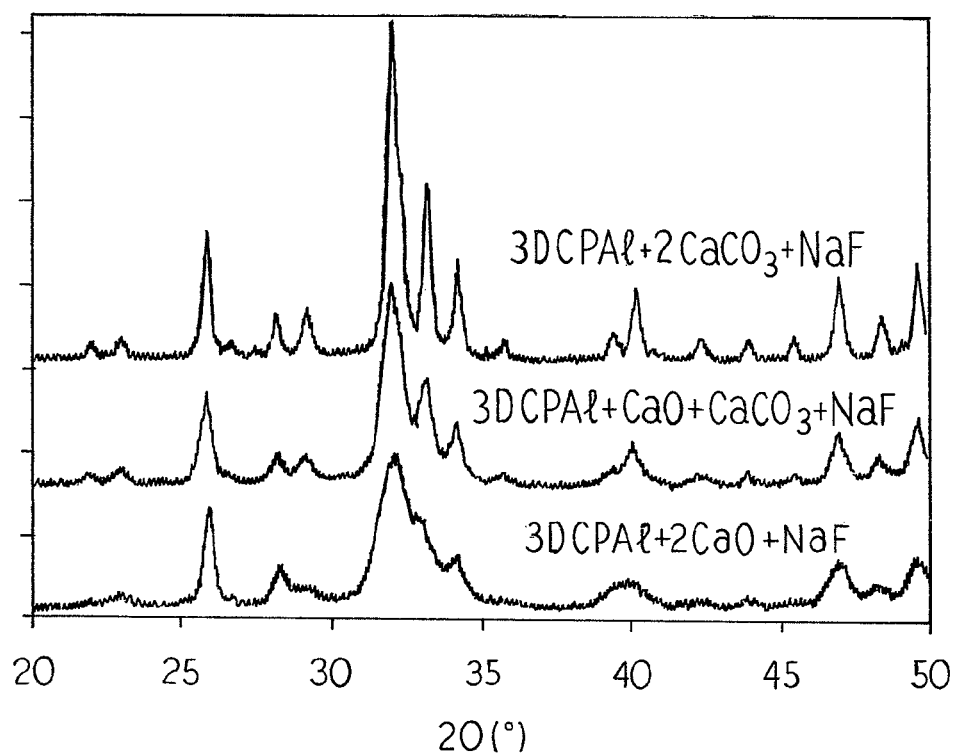
FIG. 10 are x-ray diffraction patterns of cements with changing CaO:$CaCO_3$ molar ratios showing that the F-HA crystallinity increased with increasing $CaCO_3$ content.
Figure 11:
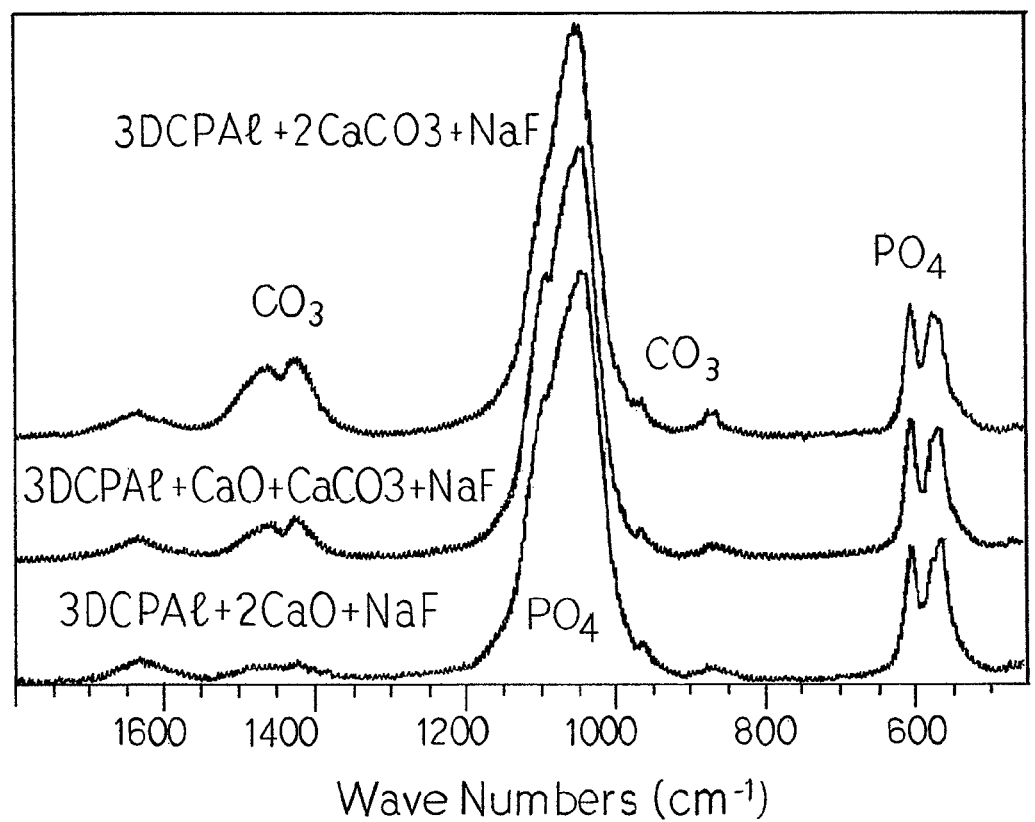
FIG. 11 is the FTIR of cement with changing CaO:$CaCO_3$ molar ratios showing the carbonate content of the F-HA cement product increased with increasing $CaCO_3$ content.

The results described above show that both the carbonate content and crystallinity of the F-HA formed in the cement were higher when CaCO$_3$ rather than CaO was used together with DCPA as the main cement ingredients. Thus, it is possible to control these parameters by adjusting the proportion of the CaO and CaCO$_3$ present in the cement mixture. To show this, we prepared cements with CaO:CaCO$_3$ molar ratios of 0:2, 1:1, 2:0. Indeed, both the F-HA crystallinity (FIG. 10) and carbonate contents (FIG. 11) of the cements can continuously varied in relation to the CaO:CaCO$_3$ ratio.

Study 4—Properties of (DCPA+TTCP+NaF) Fluorapatite-Forming Calcium Phosphate Cements Materials:

This study investigated the properties of F-containing CPC materials prepared from mixtures containing DCPA, TTCP and NaF. The various cement mixtures consisted of equal molar amounts of DCPAs (1.0 μm median size, Table 3) and either TTCPl (20.4 μm median size) or TTCPs (4.0 μm median size). The mixtures further contained various amounts of NaF to yield F/Ca molar ratios of 0, 0.05, 0.1, 0.2, and 0.4. Since pure FA has a F/Ca ratio of 0.2, the F contents in the mixtures ranged from 0 to about twice that of FA.

A 0.5 mol/L sodium phosphate (pH 5.6) solution, prepared by diluting a commercially obtained phosphate solution (Sodium Phosphates Inj, USP, Abbott Labs, N. Chicago, Ill.), was used as the cement liquid in all cases.

Experimental Design:

The TTCP particle size (TTCPs or TTCPl) and the F/Ca molar ratios (0, 0.05, 0.1, 0.2, and 0.4) of the cement mixtures were the two independent variables in this study. The measured or observed properties included cement setting time (ST) and the following properties of the set cement specimens: diametral tensile strength (DTS), porosity, F contents (in three different forms), carbonate contents, and crystallinity of the apatite phase.

Methods:

Methods used in this study were the same as the ones described in Study 3 above.

Results:

Setting time (ST), Diametral Tensile Strength (DTS), and Porosity

The mean ST, DTS and porosity of the four cements are shown in Table 7a. The ANOVA results are given in Table 7b. For all three measured parameters, ST, DTS, and porosity, both independent variables, i.e., F/Ca molar ratio and the TTCP particle size, as well as their interactions produced significant (p<0.05) effects.

The cements prepared using the TTCPl-containing mixtures exhibited ST of 8 to 9 min for F/Ca ratios of 0.05 to 0.2. The ST was longer when the F/Ca ratio was either 0 or 0.4. The cements prepared with the mixtures containing TTCPs had ST from 14 to 17 min for F/Ca ratio from 0.05 to 0.2. These values were generally longer than the corresponding cements made with TTCPl-containing mixtures.

The DTS of all F-containing cements were lower than the same cement that did not contain F (Table 7a). The DTS generally decreased with increasing F content.

The porosity of the cement appears to increase with increasing F content (Table 7a). In most cases, the cement made from the TTCPs-containing powder exhibited higher porosity than did the corresponding cement made from TTCPl-containing powder.

Amounts of F in Three Different Forms:

Mean values (mass %) of the three types of F present in the cements are shown in Table 8a, The ANOVA results (Table 8b) showed for all three types of measured F, both independent variables, i.e., F/Ca molar ratio and TTCP size, as well as their interactions produced significant effects (p<0.05).

Unreacted F—For all cements, the amount of unreacted F was 0 at low F/Ca ratio and it increased continuously with increasing F/Ca ratio, i.e., the amount of NaF added to the cement mixture. The cements prepared from the TTCPl-containing mixtures had a higher unreacted F content than the corresponding cements prepared from the TTCPs-containing mixtures.

F in the form of CaF$_2$—For all cements, the amount of incorporated F in the form of CaF$_2$ increased with increasing F/Ca ratio. The cements prepared with the TTCPl-containing mixtures showed a higher CaF$_2$-type F content than the corresponding cements prepared from the TTCPs-containing mixtures.

F incorporated into the apatitic structure—For cements made from the TTCPs-containing mixtures, the apatitic F content increased with increasing F/Ca ratio. In contrast, the cements prepared using the TTCPl-containing mixtures reached a plateau when the F/Ca ratio was 0.1 and higher. At these higher F/Ca ratios, the TTCPs-originated cements had a higher apatitic F content than the corresponding cements made from the TTCPl-containing mixtures.

Figure 12:
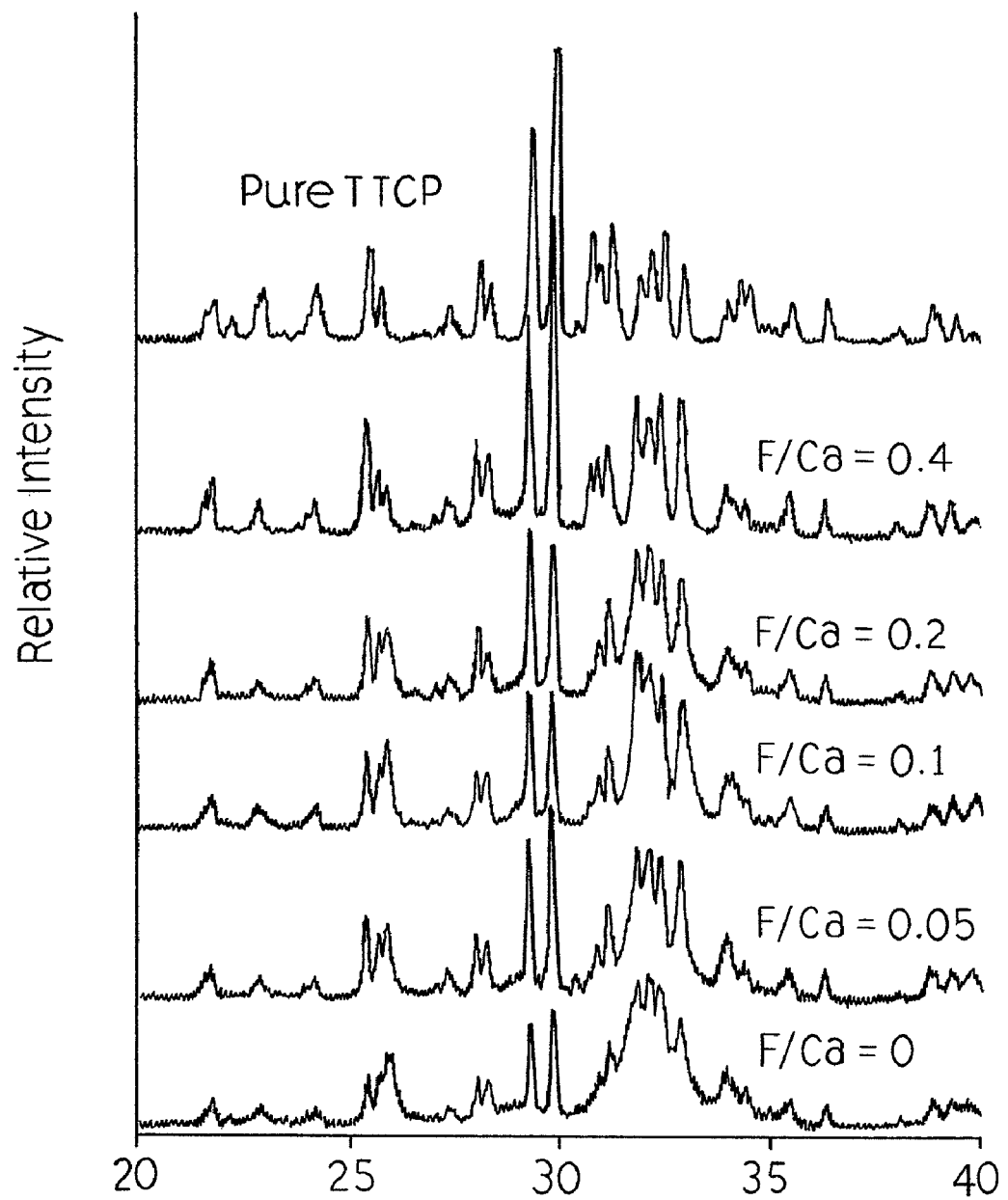
FIG. 12 is an x-ray diffraction pattern of DCPAs-TTCR cements after 20 hour incubation in PLS at 37° C.

Effects of F on Crystallinity and Amount of F-HA Formation:

The XRD patterns of the DCPAs-TTCP1 cements with F/Ca ratios from 0 to 0.4 are shown in FIG. 12. It can be seen that for these cements, the conversion of the initial cement mixture to apatite actually decreased with increasing F/Ca ratio, i.e., the F content in the initial mixture. This surprising result can be explained by the formation of a firm F-HA coating on TTCP particle surfaces in the initial stage of the cement setting reaction. This coating limited the ability of the TTCP particles to dissolve and participate further in the setting reaction. This phenomenon becomes more prominent when a higher level off F was present. The crystallinity of the apatite phase in these cements seemed unchanged with increasing F presence.

The XRD patterns of the cements prepared from the TTCPs-containing mixtures (FIG. 13) indicates that the crystallinity of the apatite phase improved slightly with increasing F content. However, extent of apatite formation also decreased slightly with increasing F content for the reason given above.

TABLE 8b

Two-way ANOVA results, main effect and interactions on unreacted F, $CaF_2$-like F, or Apatitic F

| Source | Significance, p value |
|---|---|
| F/Ca | <0.001 |
| TTCP size | <0.001 |
| Interaction | <0.001 |

All references and citations identified herein are incorporated by reference. In addition the following reference materials are incorporated by reference:

Chow L C, Markovic M, Frukhtbeyn S A, Takagi S (2005). Hydrolysis of tetracalcium phosphate under a near-constant-composition condition—effects of pH and particle size. Biomaterials. February; 26(4):393-401.

Christoffersen J. Christoffersen M R, Kibalczyc W. et al (1988). Kinetics of dissolution and growth of calcium fluoride and effects of phosphate. Acta Odontol Scand 46:325-326.

TABLE 7a

Mean ST (min), DTS (MPa) and porosity (vol %) of DCPAs-TTCP1 and DCPAs-TTCPs cements (mean ± standard deviation).

| | Cement Mixture | F/Ca Molar Ratio | | | | |
|---|---|---|---|---|---|---|
| | | 0 | 0.05 | 0.1 | 0.2 | 0.4 |
| ST | DCPAs-TTCP1 | 13.8 ± 2.5 | 8.3 ± 1.3 | 8.3 ± 1.7 | 8.8 ± 1.0 | 31.5 ± 2.4 |
| (n = 4) | DCPAs-TTCPs | 22.5 ± 2.9 | 15.8 ± 1.5 | 16.8 ± 2.4 | 14.3 ± 1.5 | 16.5 ± 1.7 |
| DTS | DCPAs-TTCP1 | 8.4 ± 1.1 | 4.5 ± 0.4 | 2.0 ± 0.1 | 1.4 ± 0.1 | 0.1 ± 0.1 |
| (n = 5) | DCPAs-TTCPs | 4.5 ± 0.4 | 3.4 ± 0.6 | 3.0 ± 0.9 | 1.5 ± 0.1 | 1.1 ± 0.1 |
| Porosity | DCPAs-TTCP1 | 35.5 ± 2.0 | 37.0 ± 2.0 | 38.5 ± 1.2 | 42.4 ± 1.0 | 49.9 ± 0.9 |
| (n = 6) | DCPAs-TTCPs | 40.4 ± 0.9 | 41.3 ± 1.2 | 42.4 ± 1.6 | 44.8 ± 1.3 | 49.3 ± 0.9 |

Values connected by a horizontal line or vertical line are not significantly different.

TABLE 7b

Two-way ANOVA results, main effect and interactions on ST, DTS, or porosity

| Source | Significance, p value |
|---|---|
| F/Ca molar ratio | <0.001 |
| TTCP size | <0.001 |
| Interaction | <0.001 |

Elliott J C (1994). Structure and chemistry of the apatites and other calcium orthophosphates.

LeGeros R Z (1991). Calcium phosphates in oral biology and medicine.

However, the discoveries and inventions set forth herein are exemplified by the reported studies along and in the context of various cited reference materials. Such examples are not limiting.

TABLE 8a

Mean values (mass %) of unreacted, $CaF2$-like F, apatitically-bound F (mean ± standard deviation; n = 3) present in the F-containing CPCs.

| Cement Mixture | | F/Ca | | | |
|---|---|---|---|---|---|
| | | 0.05 | 0.1 | 0.2 | 0.4 |
| Unreacted F | DCPAs-TTCP1 | 0.01 ± 0.00 | 0.17 ± 0.02 | 1.27 ± 0.07 | 2.82 ± 0.05 |
| | DCPAs-TTCPs | 0.00 ± 0.00 | 0.00 ± 0.00 | 0.77 ± 0.06 | 3.13 ± 0.20 |
| $CaF_2$-like F | DCPAs-TTCP1 | 0.01 ± 0.00 | 0.13 ± 0.01 | 0.76 ± 0.07 | 2.54 ± 0.17 |
| | DCPAs-TTCPs | 0.15 ± 0.01 | 0.26 ± 0.01 | 0.61 ± 0.04 | 0.70 ± 0.02 |
| Apatitic F | DCPAs-TTCP1 | 0.91 ± 0.06 | 1.52 ± 0.09 | 1.46 ± 0.07 | 1.13 ± 0.07 |
| | DCPAs-TTCPs | 0.77 ± 0.08 | 1.55 ± 0.02 | 2.11 ± 0.15 | 2.66 ± 0.05 |

Values connected by a horizontal line or vertical line are not significantly different.

What is claimed is:

1. A bone and endodontic cement material comprising:
a paste made from a mixture including:
a powder consisting of a calcium phosphate compound selected from the group consisting of dicalcium phosphate anhydrous (DCPA), dicalcium phosphate dihydrate (DCPD) and combinations thereof;
a calcium/phosphate compound having a molar ratio of about 1.5 or more and selected from the group consisting of alpha tricalcium phosphate ($\alpha$TCP), beta tricalcium phosphate ($\beta$TCP), amorphous calcium phosphate (ACP), tetracalcium phosphate (TTCP), calcium oxide (CaO) and calcium carbonate ($CaCO_3$) and combinations thereof;
a soluble fluoride compound selected from the group consisting of sodium fluoride (NaF), potassium fluoride (KF), hydrogen fluoride (HF), and combinations thereof having a pH in the range of 0.1 to 12 and a phosphate concentration in the range of 0.1 to 3.0 moles/liter; and
a solvent.

2. The cement material of claim 1 wherein a solution of said solvent comprises a phosphate concentration of 0.1 to 3 moles per liter and a pH from 0.1 to 12.

3. The cement material of claim 1 wherein said powder includes a carbonate compound.

4. The cement material of claim 2 wherein said powder includes a carbonate compound.

5. The cement material of claim 1 wherein said calcium phosphate powder compound comprises particles having a particle size in the range of about 1 to 20 μm.

6. The cement material of claim 2 wherein said calcium phosphate powder compound comprises particles having a particle size in the range of about 1 to 20 μm.

7. The cement material of claim 1 wherein the said material as cast comprises a calcium phosphate cement without fluoride.

8. The cement material of claim 1 wherein the said material as cast comprises a calcium phosphate cement and fluoride in the form of calcium fluoride ($CaF_2$) forms.

9. The cement material of claim 1 wherein the said material as cast comprises a calcium phosphate cement including fluoride in a fluoride-substituted hydroxyapatite form.

10. The cement material of claim 1 wherein said solvent comprises $H_3PO_4$.

11. The cement material of claim 1 wherein said solvent comprises an aqueous solution.

12. The cement material of claim 3 wherein said carbonate is $CaCO_3$.

13. The cement material of claim 4 wherein said carbonate is $CaCO_3$.

14. The cement material of claim 1 wherein the solvent comprises an aqueous solution of $H_3PO_4$ having a phosphate concentration of 0.1 to 3 moles per liter and a pH of 0.1 to 12 and wherein said powder comprises particles having a particle size in the range of about 1 to 20 μm.

15. The cement material of claim 14 wherein said powder includes a carbonate compound.

16. The cement material of claim 15 wherein said carbonate compound is $CaCO_3$.

17. The cement material of claim 14 wherein the said material as cast comprises a calcium phosphate cement without fluoride.

18. The cement material of claim 14 wherein in the said material as cast comprises a calcium phosphate cement and fluoride in the form of calcium fluoride ($CaF_2$) forms.

19. The cement material of claim 14 wherein the said material as cast comprises a calcium phosphate cement including fluoride in a fluoride-substituted hydroxyapatite form.

* * * * *